United States Patent
Thayne et al.

[19]

[11] Patent Number: 5,943,193
[45] Date of Patent: *Aug. 24, 1999

[54] HEAD PARK MECHANISM IN A DATA STORAGE DEVICE FOR PREVENTING ACCIDENTAL DAMAGE

[75] Inventors: Mark S. Thayne, West Point; David E. Jones; Kelly D. Wright, both of Layton, all of Utah

[73] Assignee: Iomega Corporation, Roy, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,371

[22] Filed: Nov. 1, 1996

Related U.S. Application Data

[63] Continuation of application No. 08/398,656, Mar. 3, 1995, abandoned.

[51] Int. Cl.$^6$ ............................. G11B 5/54; G11B 21/22
[52] U.S. Cl. ............................................. 360/105
[58] Field of Search ................... 360/104, 105, 360/99.02, 99.06, 97.01; 369/219, 220, 223, 249

[56] References Cited

U.S. PATENT DOCUMENTS

| | | | |
|---|---|---|---|
| 4,400,748 | 8/1983 | Bauck et al. | 360/99 |
| 4,419,703 | 12/1983 | Gruczelak et al. | 360/97 |
| 4,445,157 | 4/1984 | Takahashi | 360/133 |
| 4,502,083 | 2/1985 | Bauck et al. | 360/99 |
| 4,504,879 | 3/1985 | Toldi et al. | 360/105 |
| 4,571,646 | 2/1986 | Bauck et al. | 360/99 |
| 4,581,669 | 4/1986 | Tsuji et al. | 360/97 |
| 4,656,542 | 4/1987 | Shibata | 360/97 |
| 4,683,506 | 7/1987 | Toldi et al. | 360/105 |
| 4,870,518 | 9/1989 | Thompson et al. | 360/97.01 |
| 4,953,042 | 8/1990 | Yoshikawa | 360/96.5 |
| 4,965,685 | 10/1990 | Thompson et al. | 360/97.01 |
| 5,204,793 | 4/1993 | Plonczak | 360/97.01 |
| 5,218,503 | 6/1993 | Martin | 360/133 |
| 5,262,918 | 11/1993 | Tannert | 360/133 |
| 5,278,819 | 1/1994 | Shimegi et al. | 369/215 |
| 5,291,361 | 3/1994 | Yokota | 360/106 |
| 5,303,102 | 4/1994 | Aruga et al. | 360/105 |
| 5,317,464 | 5/1994 | Witt et al. | 360/99.08 |
| 5,396,385 | 3/1995 | Tangi et al. | 360/105 |
| 5,463,512 | 10/1995 | Hashimoto et al. | 360/104 |

FOREIGN PATENT DOCUMENTS

| | | | |
|---|---|---|---|
| 0 348 197 A2 | 12/1989 | European Pat. Off. | |
| 62-9569 | 1/1987 | Japan | 360/105 |
| 5-2905232 | 11/1993 | Japan | |
| 5-290532 | 11/1993 | Japan | 360/105 |
| WO 89/08306 | 9/1989 | WIPO | |
| 93 18507 | 9/1993 | WIPO | |
| WO 93/18507 | 9/1993 | WIPO | |

OTHER PUBLICATIONS

Godwin, J., "An Introduction to the Insite 325 Floptical® Disk Drive", Optical Data Storage Topical Meeting, SPIE vol. 1078 (1989).

*Primary Examiner*—William J. Klimowicz
*Attorney, Agent, or Firm*—Woodcock Washburn Kurtz Mackiewicz & Norris LLP

[57] ABSTRACT

A data storage device for receiving a removable disk cartridge includes a slidable platform, a retractable head, and a head retractor. The slidable platform slides between a forward position where the disk cartridge is ejected and a reward position where the disk cartridge is held for data accessing. Thus, when the disk cartridge is ejected, the slidable platform slides forward from the rearward position. As the platform travels forward, the head retractor is caused to drives the retractable heads to their safe park position so as to avoid any damage to the heads.

14 Claims, 8 Drawing Sheets

HEAD PARK MECHANISM IN A DATA STORAGE DEVICE FOR PREVENTING ACCIDENTAL DAMAGE

This is a continuation of application Ser. No. 08/398,656, filed Mar. 3, 1995, now abandoned.

BACKGROUND

1. Field of the Invention

The present invention relates to a data storage device of the type that accepts a removable disk cartridge, and more particularly, to a mechanism to secure read/write heads at a predetermined safe position when the heads are supposed to be in the predetermined safe position.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a data storage device, e.g., disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

Disk drives for receiving removable disk cartridges, including conventional 3.5" floppy disk drives, must have some mechanism for detecting the insertion or presence of a disk cartridge in the drive. The actuator that carries the recording heads of the disk drive across the recording surfaces of the disk should not be allowed to move unless the presence of a disk cartridge is detected. In the prior art, mechanical or electrical switches are typically employed to detect the presence of a disk cartridge within the drive. Such switches are typically positioned so that when a disk cartridge is inserted fully into the drive, the cartridge contacts the switch, thereby providing an indication that the disk cartridge is present.

After the cartridge is removed from the disk drive, the disk drive generally retrieves the read/write heads into a predetermined safe position so as to prevent any damage to the read/write heads. Such head retrieval usually relies on a signal from the above described switches. However, under certain circumstances, the absence of a disk cartridge in the disk drive may not be correctly detected by these switches. For example, power failure may disable an electrical switch. The failure of the disk detecting means in the absence of a disk cartridge in the disk drive may leave the heads at a unretracted position. Such unretracted heads are not protected from damage.

The above described head damage may also occur under different circumstances. A user may inappropriately eject or intentionally remove the cartridge from the drive when the heads are not yet retracted to a safe position. Regardless of the reason for the unretracted heads in the absence of the disk cartridge in the disk drive, the current invention is directed to solve the above described problem of damage to the unretracted read/write heads in a data storage device.

SUMMARY OF THE INVENTION

The present invention is directed to a data storage device, or disk drive, for receiving a removable disk cartridge.

According to the present invention, the data storage device receives a removable disk cartridge containing a disk for reading from and writing to the disk and comprises a disk ejector, a retractable head and a head retractor. The disk ejector ejects the removable disk cartridge from the data storage device. The retractable head is movably placed in a predetermined path over the disk while it is at a predetermined operating position or it is placed at a predetermined park position which is located off the disk for safely parking the head. The retractable head at the operating position reads from and writes to the disk. The head retractor engages the retractable head and is operationally connected to the disk ejector for retracting the retractable head to the above mentioned predetermined park position when the ejector ejects the removable disk cartridge.

According to a second or a third aspect of the current invention, the retractable head may respectively include a rotary actuator or a linear actuator.

According to a fourth aspect of the current invention, the data storage device further includes a path guide located adjacent to the predetermine path for guiding the head in at least a part of the predetermined path.

Another implementation of a data storage device of the current invention also receives a disk cartridge containing a disk and comprises a slidable platform, a retractable head and a head retractor. The slidable platform slides between a first position and a second position. The slidable platform is positioned at the predetermined first position when the slidable platform does not hold the disk cartridge for accessing the disk. On the other hand, the slidable platform is positioned at the predetermined second position when the slidable platform holds the disk cartridge for accessing the disk. The retractable head is movably placed in a predetermined path over the disk when it is at a predetermined head operating position. The retractable head is also placed off the disk at a predetermined head park position. The retractable head at said predetermined head operating position reads from and writes to the disk. The head retractor is operationally connected to the slidable platform and the retractable head for retracting the retractable head to the predetermined head park position when the slidable platform is positioned at the predetermined first position.

According to a fifth aspect of the current invention, the head retractor further includes an arm, a biasing means and a path guide. The arm has a movable end and a pivoted end. The movable end engages the retractable head and moves in a predetermined arm path between a predetermined arm front position and a predetermined arm rear position. The biasing means is connected to the arm for biasing the movable end towards the predetermined arm rear position. The path guide is located adjacent to the arm for guiding the arm in at least a part of the predetermined arm path and places the arm at the predetermined arm front position when the platform is positioned at the second predetermined position thereby allowing the retractable head to freely move over the disk.

According to a sixth aspect of the current invention, the biasing means is a spring and is positioned to form an acute angle with respect to the arm.

According to a seventh aspect of the current invention, the path guide further includes a front post which is located near the predetermined arm front park position for preventing the arm from moving beyond the front post; and a rear post which is located near the predetermined arm rear park position for preventing the arm from exerting pressure on the retractable head at the predetermined park position.

According to an eighth aspect of the current invention, the data storage device further includes a latch which is located near the predetermined head park position for latching the retractable head in the predetermined head park position.

According to the current invention, one method of securing a retractable recording/writing head at a predetermined head park position by a head retractor when a removable disk cartridge containing a disk is not in a disk housing, includes the steps of a) biasing the head retractor, b) inserting the removable disk cartridge, c) ejecting the disk cartridge, and d) driving the retractable head. The step a) is to place a bias upon the head retractor towards the predetermined head park position. The step b) is to insert the removable disk cartridge in the disk housing so as to generate a force to overcome the bias placed in the step a) on the head retractor. The step c) is to eject the removable disk cartridge from the disk housing. The step d) is to drive the retractable head to the predetermined park position due to the bias placed in the step a) by removing the force placed on the head retractor in said step b) upon ejecting the disk cartridge in the step c).

According to the current invention, a second method of securing a retractable recording/writing head at a predetermined head park position by a head retractor when a removable disk cartridge containing a disk is not placed on a slidable platform, includes the steps of a) placing a bias, b) inserting a removable disk cartridge, c) ejecting the removable disk cartridge, and d) driving the retractable head. The step a) is to place a bias upon the head retractor towards the predetermined head park position. The step b) is to insert the removable disk cartridge onto the slidable platform while sliding the slidable platform from a predetermined ejecting position to a predetermined receiving position so as to generate a force to overcome the bias placed in the step a) on the head retractor. The step c) is to eject the removable disk cartridge from the slidable platform while sliding the slidable platform from the predetermined receiving position to a predetermined ejecting position. The step d) is to drive the retractable head to the predetermined park position due to the bias placed in the step a) by removing the force placed on the head retractor in the step b) upon ejecting the disk cartridge in the step c).

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

Figure 1:
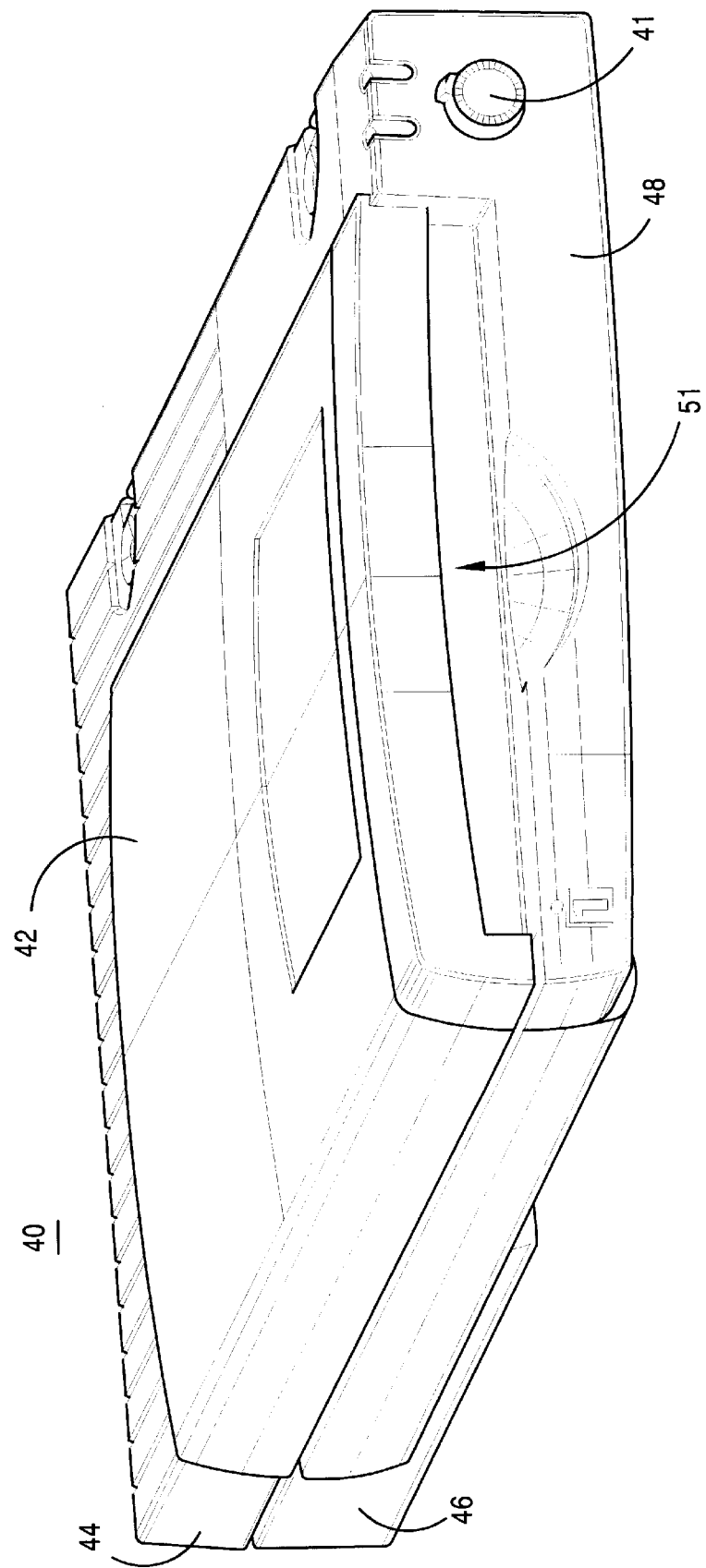
FIG. 1 is a perspective view of a data storage device, or disk drive, in which the present invention is embodied.

Referring to the drawings wherein like numerals indicate like elements throughout, there is shown in FIG. 1 a data storage device, or disk drive 40, in which the present invention is embodied. As shown, the disk drive 40 comprises an outer housing 42 having top and bottom covers 44, 46 and a front panel 48. A disk cartridge can be inserted into the disk drive 40 through a horizontal opening 51 in the front panel 48 of the disk drive 40. An eject button 41 is also provided on the front panel for automatically ejecting a disk cartridge from the disk drive 40. The disk drive 40 can be employed as a stand-alone unit, or alternatively, can be employed as an internal disk drive of a computer (not shown).

Figure 2:
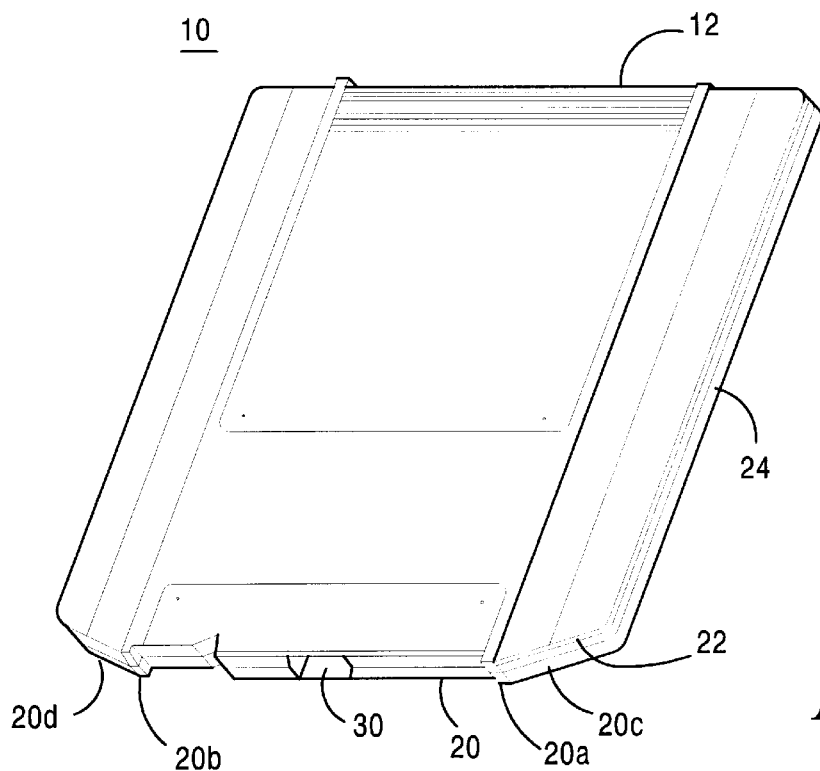
FIG. 2 is a perspective view of a disk cartridge for use with the disk drive of the FIG. 1.
Figure 3:
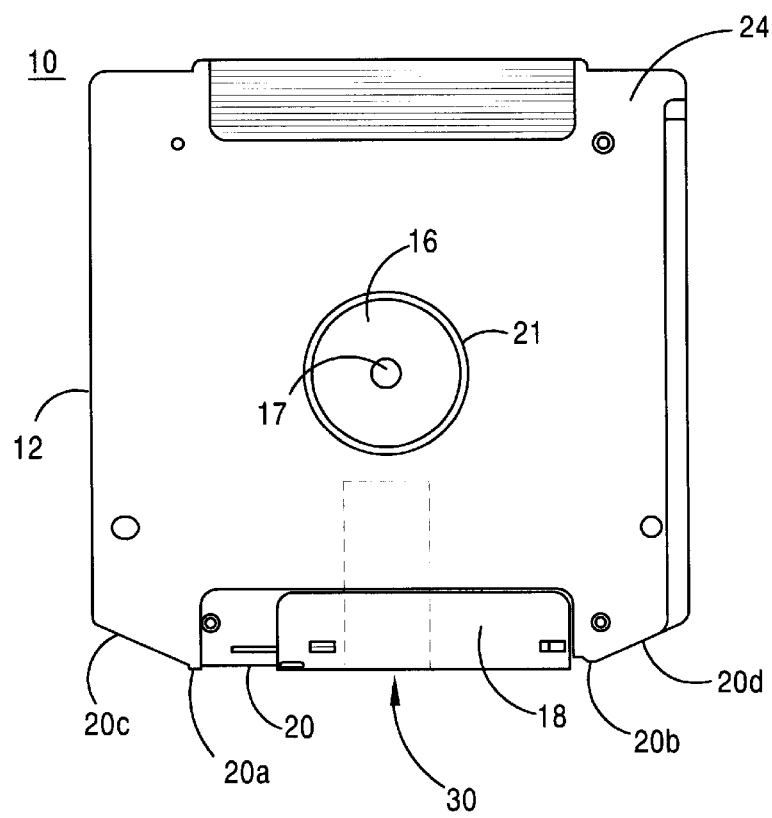
FIG. 3 is a bottom view of the disk cartridge of FIG. 2.

FIGS. 2 and 3 show an exemplary disk cartridge 10 adapted for use in the disk drive 40 of FIG. 1. As shown, the disk cartridge 10 comprises an outer casing 12 having upper and lower shells 22, 24 that mate to form the casing. A disk-shaped recording medium 14 (not shown) is affixed to a hub 16 that is rotatably mounted in the casing 12. An opening 21 (not shown in FIG. 1) on the bottom shell 24 of the casing 12 provides access to the disk hub 16. A head access opening 30 in the front peripheral edge 20 of the disk cartridge 10 provides access to the recording surfaces of the disk 14 by the recording heads of the disk drive. A shutter 18 (not shown in FIG. 2) is provided on the front peripheral edge 20 of the disk cartridge 10 to cover the head access opening 30 when the cartridge is not in use. When the cartridge is inserted into the disk drive, the shutter 18 moves to the side exposing the head access opening 30 and thereby providing the heads of the drive with access to the recording surface of the disk. In the present embodiment, the casing houses a flexible or floppy magnetic disk, however, in other embodiments, the disk may comprise a rigid magnetic disk, a magneto-optical disk or an optical storage medium.

The opposite front corners of the disk cartridge 10 have a non-square shape defined by angled surfaces 20c, 20d that angle away from the front peripheral edge 20 of the cartridge at a predetermined angle. Additionally, a pair of projections 20a, 20b are formed on the front peripheral edge 20 of the cartridge. Each projection 20a, 20b is formed adjacent a respective one of the angled surfaces 20c, 20d at the point where the respective surface 20c, 20d begins to angle away from the plane of the front peripheral edge 20 of the cartridge 10.

Figure 4:
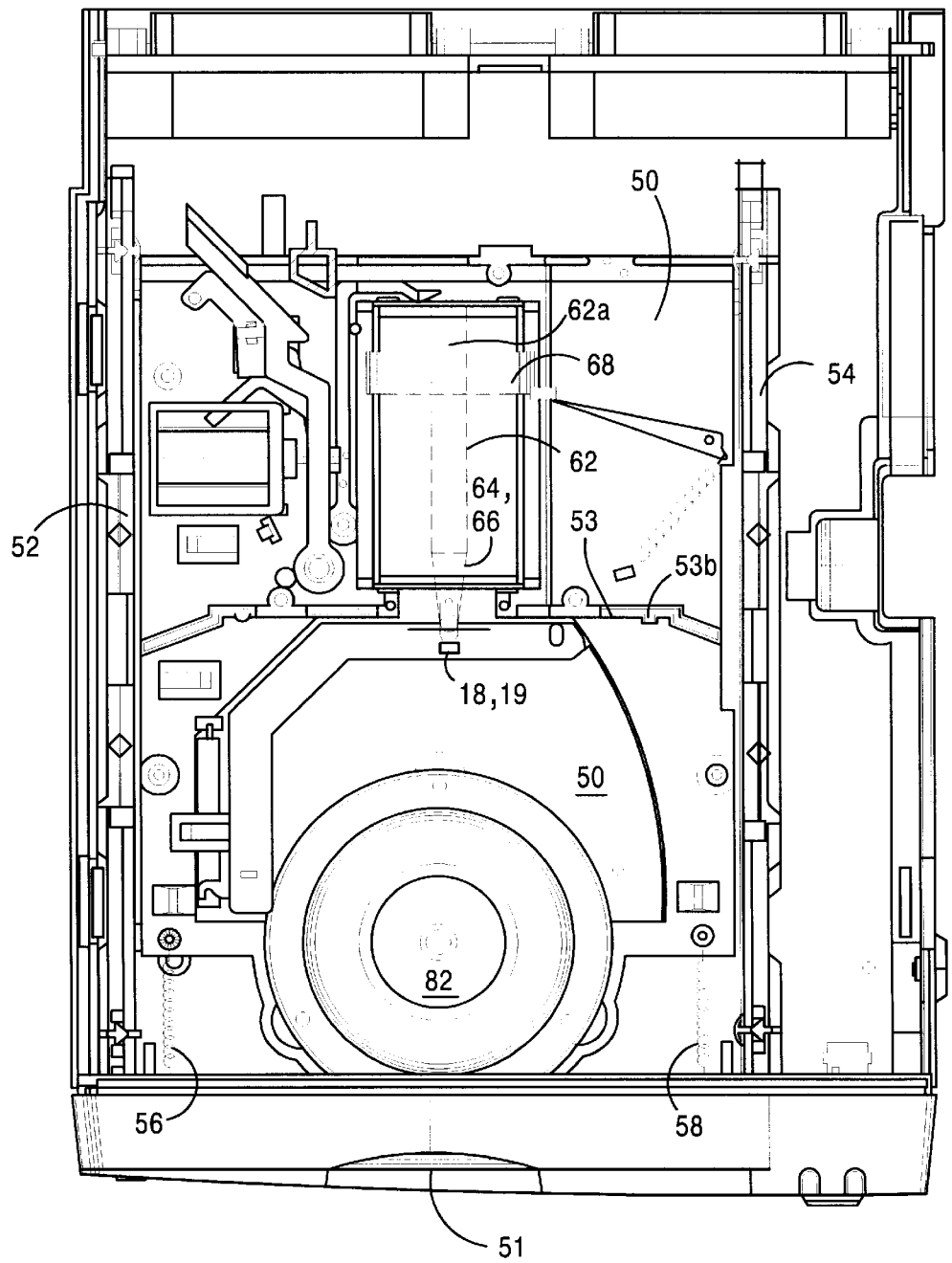
FIG. 4 is a top view of the data storage device of FIG. 1 with a top cover of the device housing removed.
Figure 5:
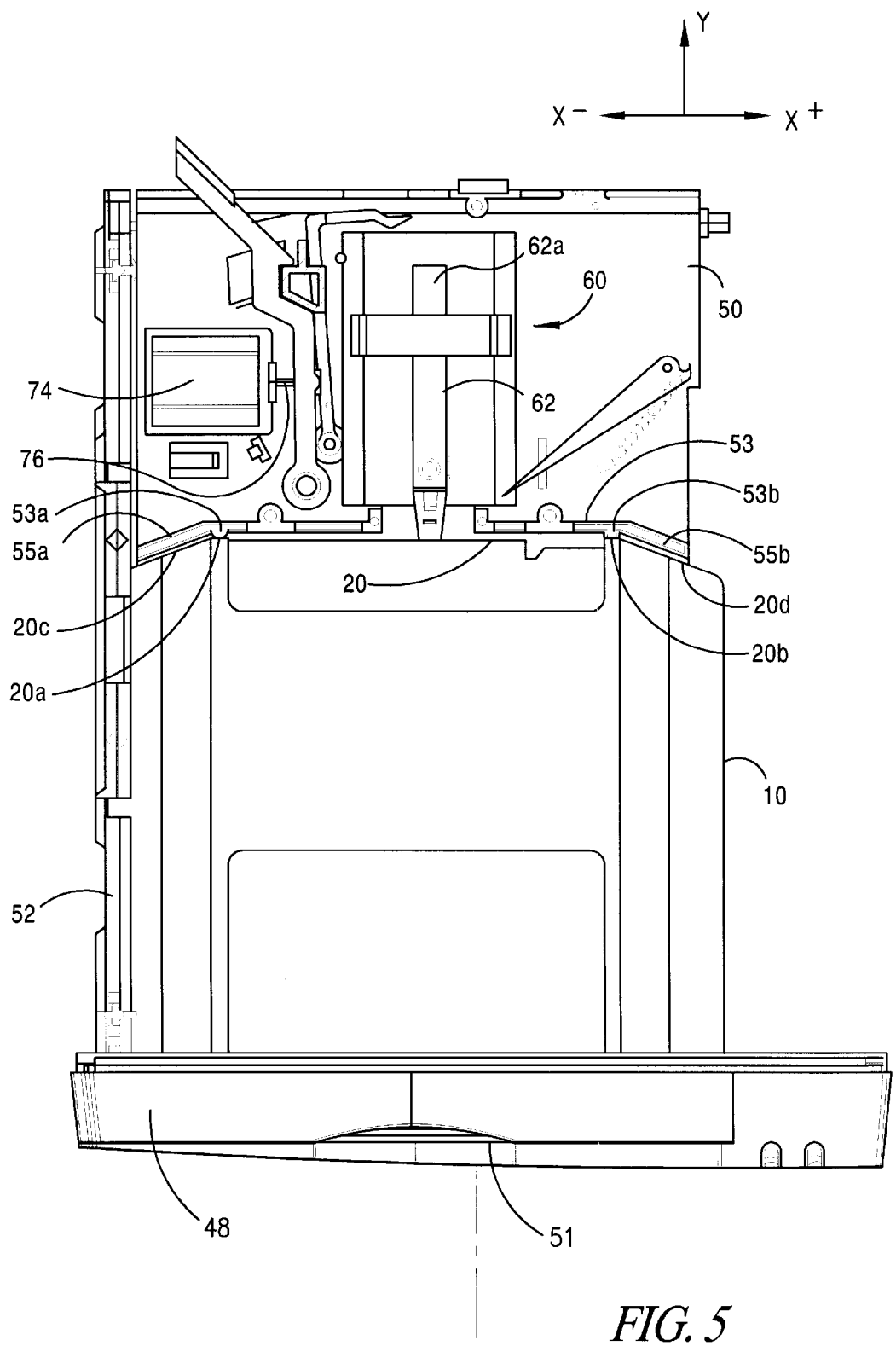
FIG. 5 is a top view of the data storage device of FIG. 4 illustrating the insertion of a disk cartridge into the device.

FIGS. 4 and 5 are top views of the disk drive 40 of FIG. 1 with the top cover 44 removed. The disk drive 40 comprises an internal slidable platform 50 that slides along opposing side rails 52, 54 between a forward position (FIG. 4) and a rearward position (FIG. 5). A pair of springs 56, 58 bias the platform 50 toward its forward position. The disk drive 40 further comprises a spindle motor 82 capable of rotating the recording medium of a disk cartridge at a predetermined operating speed. In the present embodiment, the spindle motor 82 is coupled to the platform 50.

In one preferred embodiment according to the current invention, an actuator 60, which comprises a linear actuator, is mounted to the rear of the platform 50. The linear actuator 60 comprises a carriage assembly 62 having two lightweight flexible arms 64, 66 placed on the top of each other in parallel. The recording heads 18, 19 are mounted at the distal ends of the respective arms 64, 66. A coil 68, which is part of a voice coil motor, is mounted at the opposite end of the carriage 62. The coil 68 interacts with magnets (not shown) to move the carriage linearly so that the heads 18 and 19 can move radially over respective recording surfaces of a disk cartridge inserted into the disk drive (see FIG. 5). Additional details of the linear actuator 60 are provided in co-pending application Ser. No. 08/324,599, filed Oct. 18, 1994, entitled "Actuator for Data Storage Device" (Attorney Docket IOM-8908), which is incorporated herein by reference.

A raised wall 53 is formed on the platform. The raised wall 53 extends across the width of the platform 50, perpendicularly to the direction of motion of the carriage 62. The raised wall 53 defines an eject member that engages the front peripheral edge 20 of the disk cartridge 10 upon insertion of the disk cartridge into the disk drive. The opposite side edges 55a, 55b of the eject member 53 are angled in the same manner as the opposite front corners 20c, 20d of the disk cartridge 10. Thus, the shape of the eject member 53 mirrors the contour of the forward end face of the cartridge. As further shown, the front surface of the eject member 53 has a pair of projections 53a, 53b positioned near the angled surfaces 55a, 55b.

Referring to FIG. 5, as the disk cartridge 10 is inserted into the disk drive through the opening 51, the platform 50 is pushed back towards the rearward position. When the disk cartridge 10 is completely inserted into the disk drive, the platform 50 is latched in the predetermined rearward position and the hub 16 of the disk cartridge engages the spindle motor 82 of the disk drive 40 (not shown).

Figure 6:
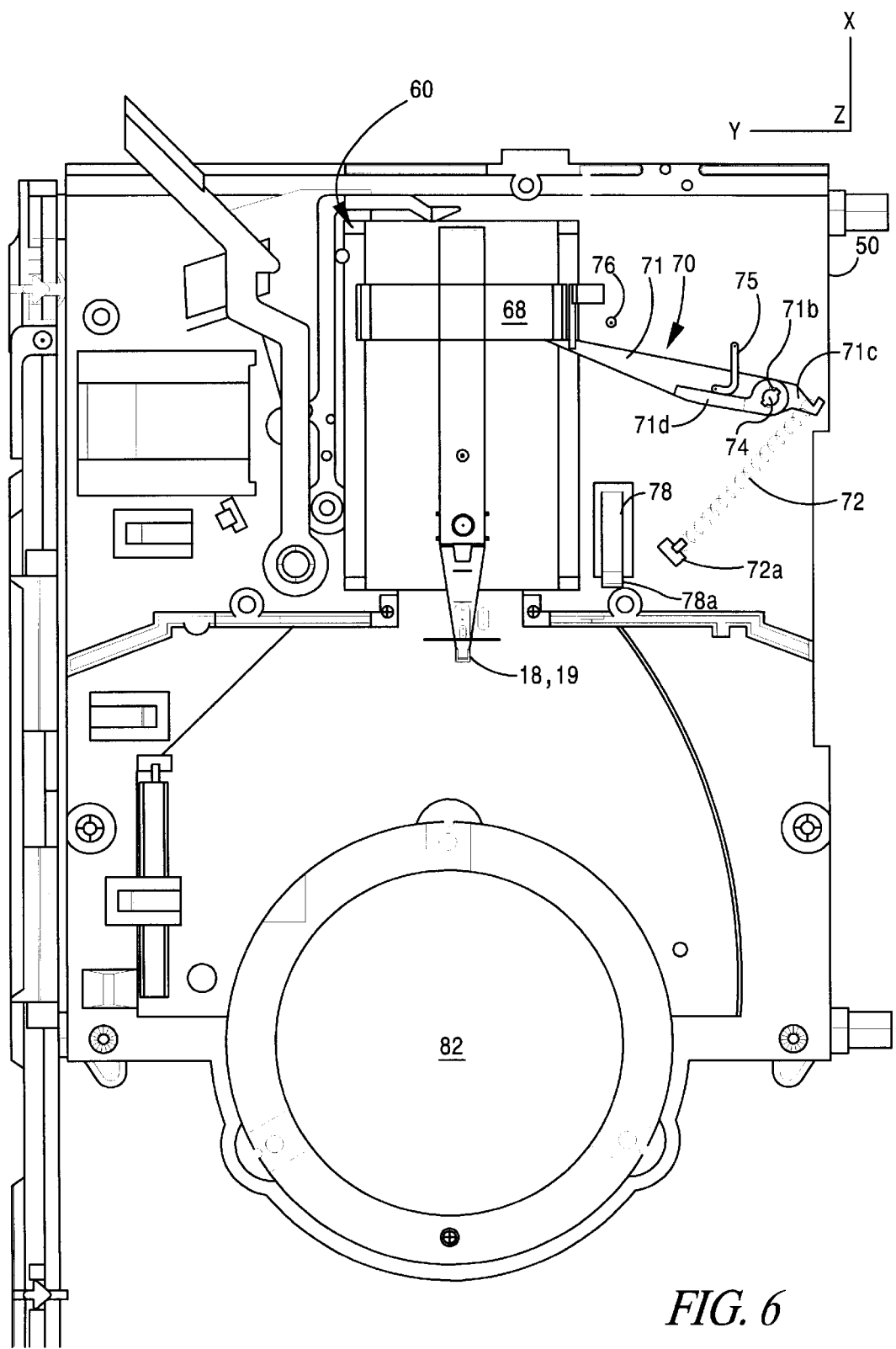
FIG. 6 is a close-up top view of one embodiment of the current invention in the data storage device of FIG. 4 with a top cover of the linear actuator housing removed.
Figure 7:
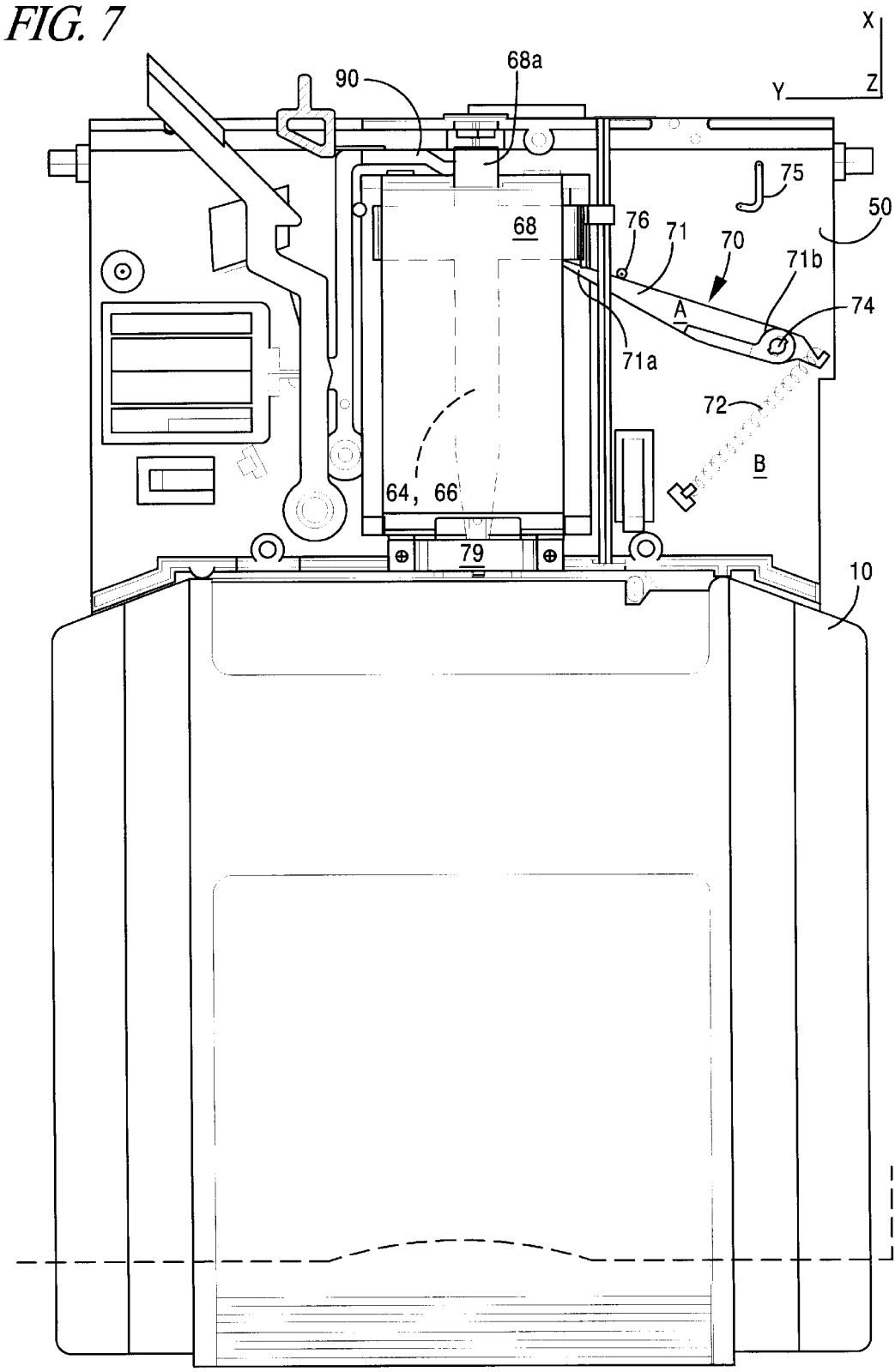
FIG. 7 is also a close-up top view of the data storage device of FIG. 4 with the recording/writing heads at a predetermined park position.
Figure 8:
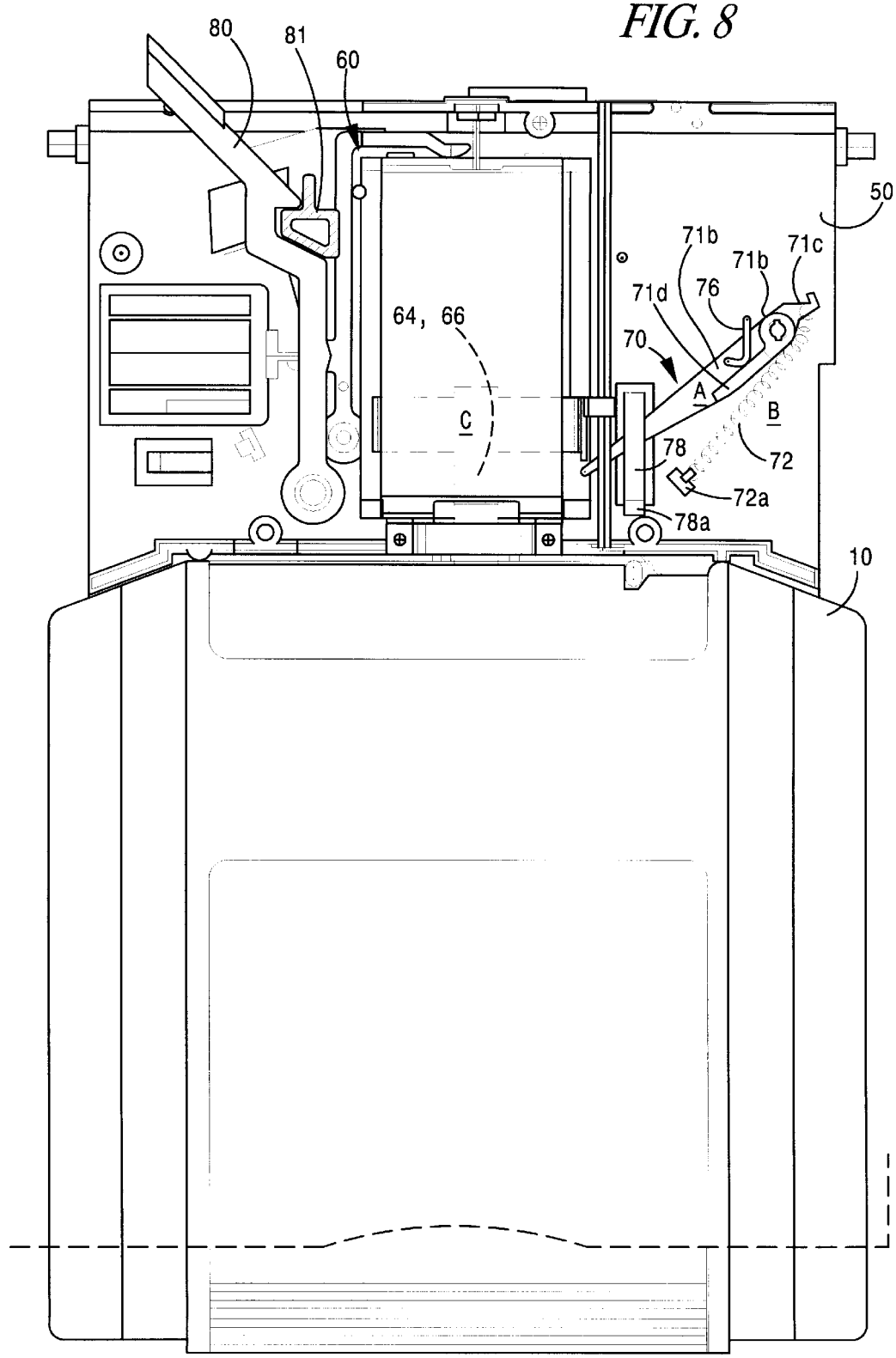
FIG. 8 is also a close-up top view of the data storage device of FIG. 4 with the recording/writing heads at a predetermined operation position.

According to the present invention, one preferred embodiment is illustrated by FIGS. 6–8. FIG. 6 is a close-up top view of FIG. 4. FIG. 7 illustrates that the disk cartridge 10 is not fully inserted in the disk drive while FIG. 8 shows a close-up top view when the disk cartridge 10 is fully inserted into the disk drive and latched at a predetermined position for reading from and writing to the disk.

According to the present invention, one preferred embodiment of the head retractor 70 comprises an arm 71 with a distal moving end 71a, the pivoted portion 71b, a spring engaging portion 71c and a stationary post engaging portion 71d. The distal moving end 71a moves in a predetermined circular path as the arm 71 rotates around a rotation post 74, which engages a bore in the pivoted portion 71b. One end of the predetermined circular path is delimited by a rear stop post 76 while the other end of the path is delimited by a front stop post 78a. As the distal moving end 71a moves towards the front stop post 78a, since the distal moving end 71a is outside the actuator housing 60, a path guide 78 guides the movement of the arm 71. On the other hand, as the moving end 71a travels towards the rear stop post 76, it enters the actuator housing 60 through a side opening. FIG. 6 illustrates a top view without a top cover of the actuator housing.

According to one preferred embodiment of the current invention, the arm 71 is generally urged by a spring 72 in a clockwise direction towards the rear stop post 76 away from the spindle 82. One end of the spring 72 engages the spring engaging portion 71c of the arm 71 while the other end of the spring 72 is anchored to the platform 50 at a predetermined position 72a. As the result of urging by the spring 72, the distal moving portion 71a engages the coil 68 of the linear actuator 60 and drives the carriage assembly 62 as well as the heads 18, 19 away from the spindle 82 towards the back edge of the platform 50.

FIG. 7 illustrates a linear actuator 60 and a head retractor 70 located on the platform 50 in relation to a disk cartridge 10. Although a portion of the disk cartridge 10 is inserted into the disk drive through an opening 51, the platform 50 is still positioned at a forward position. The head retractor 70 is urged by a spring 72 towards the rear stop post 76. The moving end 71a thus drives the heads 18, 19 towards the back edge of the platform 50 away from the disk cartridge 10 so that the carriage assembly rear portion 68a is latched at a predetermined head park position by a latch 90. At the predetermined head park position, the recording/writing heads 18 and 19 respectively located at a distal end of the flexible arms 64, 66 are also safely latched. The safely parked heads 18, 19 are out of the disk cartridge 10 and protected in part by a head protective portion 79. At the head park position, the moving end 71a is positioned at a predetermined arm rear position and abuts the rear stop post 76 so as not to exert undesirable force on the assembly carriage 68.

Referring to FIG. 8, the partially inserted disk cartridge 10 of FIG. 7 is further inserted into the disk drive to its disk access position. As the disk cartridge 10 is inserted, the platform 50 is pushed rearwardly against the bias exerted by the springs 56, 58 (FIG. 4) until it is latched to the rearward position by a platform latch lever 80 and a stationary latch post 81, which projects downwardly from an inside surface of the top cover 44. During the reward platform travel, the stationary post 75, which also projects downwardly from an inside surface of the top cover 44, comes in contact with the stationary post engaging portion 71d of the retractor 70. In effect, the stationary post 75 pushes the retractor against the bias exerted by the spring 72 towards the front stop post 78a as the platform 50 travels in the opposite direction towards its predetermined rearward position. When the disk cartridge 10 is fully inserted into the drive to the disk access position, the retractor 70 is positioned at a predetermined arm front position outside the linear actuator housing 60 in the path guide 78. The retractor 70 at this forward position does not interfere with a movement of any member of the linear actuator 60. The heads are said to be in the head operating position when the heads are not latched in the head park position. As shown in FIG. 8, the heads 18, 19 located on the flexible arms 64, 66 are inserted into the disk cartridge 10.

Still referring to FIG. 8, at the arm front position, the arm 71 and the spring 72 form an acute angle or they may be substantially in parallel. In other words, the spring anchor 72a is positioned at a predetermined position such that a force exerted by the spring 72 on the arm 71 is minimally converted into a rotational force on the arm 71 and the substantial portion of the force is exerted on the rotation post 74. The minimal rotational force of the arm 71 in turn exerts a substantially reduced force on the stationary post 75 via the engaging portion 71d for urging the platform 50 to travel towards its front position. This short moment arm arrangement substantially reduces a necessary force to unlatch the platform 50 so as to return to its forward position while ejecting the disk cartridge 10 out of the disk drive housing. At the same time, because of the position of the spring anchor 72a and the pivot portion 71b, during unloading of the disk cartridge, the arm 71 provides a larger moment arm so as to effectively move the heads 18, 19 towards their predetermined park position.

Now referring to FIGS. 7 and 8, during the operation of the disk drive 40, for any reason, if the disk cartridge 10 is ejected from the predetermined disk access position, the platform 50 also moves forward over the distance of 15 mm to its predetermined forward position. However, before the platform 50 moves approximately 5 mm forward from its latched rearward position, the retractor arm 70 drives the heads 18, 19 to the head park position. The above described head retraction to the park position is initiated whenever the disk cartridge is intentionally or unintentionally removed from its disk access position to avoid the head damage. For example, the disk cartridge may be ejected by the user or the disk cartridge may be thrown out when the disk drive is accidentally dropped to the floor.

Figure 9:
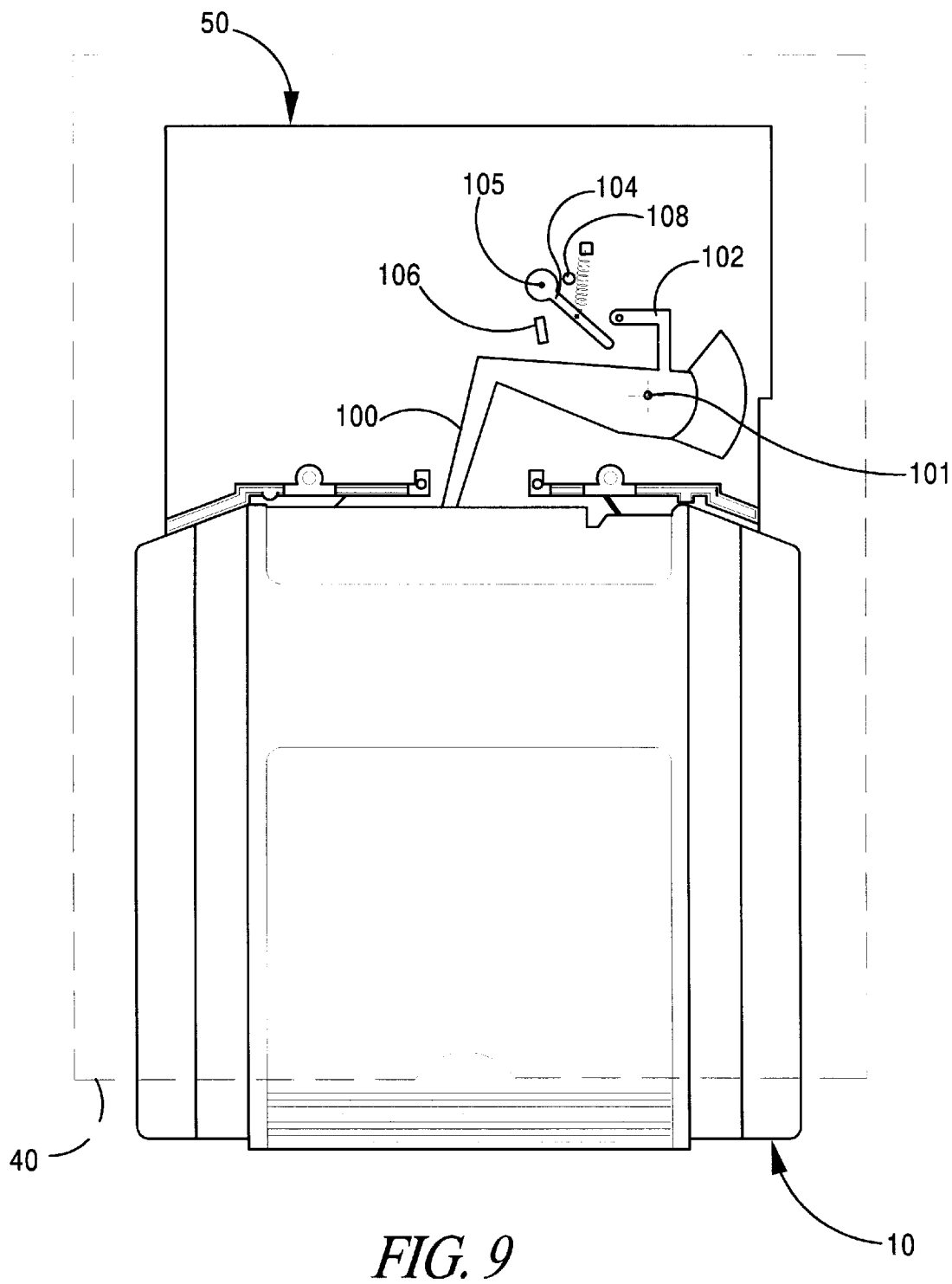
FIG. 9 is another embodiment of the current invention with a rotary actuator.

FIG. 9 illustrates a second embodiment of the present invention using a rotary head actuator. A cartridge 10 is placed over a slidable platform 50. As described above for the linear actuator, as the cartridge 10 is inserted in the disk drive 40, the slidable platform 50 slides towards the back of the housing. A rotary actuator arm 100 rotates around an axis of the rotating post 101. Reading and writing heads are placed at one end of the rotary actuator arm 100. The rotary actuator further includes a head retractor contacting portion 102. A head retractor 104 is located adjacent to the rotary actuator arm 100 and rotates around an axis of a retractor post 105. The head retractor 104 is biased towards the back of the disk drive housing 40.

Referring to FIG. 9, when the cartridge 10 is inserted, as the platform 50 slides backward, the head retractor 104 is pushed towards the front stop post 106 by a stationary boss 108 which projects from an inner surface of the upper disk housing portion. When the head retractor 104 is at the front stop post 106, the rotary actuator arm 100 is free to rotate to place the heads at any predetermined position over a disk in the disk cartridge 10.

Still referring to FIG. 9, on the other hand, when the cartridge 10 is ejected from the disk drive 40, as the platform slides in the forward direction, the biased head retractor 104 rotates away from the front stop post 106 towards the back of the disk drive. During this rotational movement, the head retractor 104 engages the head retractor contacting portion 102 of the rotary actuator arm 100 and drives the rotary actuator arm 100 to a predetermined safe park position. As a result, when the disk cartridge 10 is ejected, the reading and writing heads are positioned outside of the disk cartridge 10 and are protected from accidental damage.

As the foregoing illustrates, the present invention is directed to a data storage device having apparatus for securing heads in the park position when the disk cartridge is not in the disk drive. By achieving this function using the retractor arm, the heads are protected from damage. The present invention may be employed in any data storage device and is by no means limited to uses described herein. For example, the present invention may be employed in a disk drive that has either a stationary platform, or no platform at all. Additionally, the present invention may be employed in a disk drive that has either the rotary actuator or the linear actuator shown and described herein. Thus, it is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A data storage device for receiving a removable disk cartridge containing a disk, wherein the removable disk cartridge moves into and out of the data storage device along a first path, comprising:

a disk ejector for engaging and ejecting the removable disk cartridge from the data storage device along said first path;

a read-write head movable along a second path, wherein said read-write head moves over the disk at a predetermined operating position after the insertion of said removable cartridge and off the disk to a predetermined park position in response to the ejection of said removable cartridge;

an actuator to which said read-write head is movably coupled, said actuator movably located within the data storage device such that said actuator moves with said disk ejector as said disk ejector ejects the removable disk cartridge; and a head retractor engaging said read-write head and retracting said read-write head to said predetermined park position along said second path when said head retractor is moved with said disk ejector as said disk ejector ejects the removable disk cartridge.

2. The data storage device recited in claim 1 wherein said read-write head further comprises a rotary actuator.

3. The data storage device recited in claim 1 wherein said read-write head further comprises a linear actuator.

4. The data storage device recited in claim 1 further comprising a path guide located adjacent to said second path for guiding said head in at least a part of said second path.

5. A data storage device for receiving a disk cartridge containing a disk, comprising:

a slidable platform for removably holding the disk cartridge and sliding along a first path between a predetermined first position and a predetermined second position, said slidable platform being positioned at said first predetermined position when said slidable platform does not hold the disk cartridge for accessing the disk, said slidable platform being positioned at said second predetermined position when said slidable platform holds the disk cartridge for accessing the disk;

a read-write head mounted on said slidable platform and movably placed in a second path, wherein said read-write head moves over the disk at a predetermined head operating position and off the disk to a predetermined head park position along said second path, said read-write head at said predetermined head operating position reading from and writing to the disk; and a head retractor operationally connected to said slidable platform and said read-write head for retracting said read-write head along said second path to said predetermined head park position in response to said slidable platform moving toward said first predetermined position.

6. The data storage device recited in claim 5 wherein said head retractor further comprises:

an arm having a movable end and a pivoted end, said movable end engaging said read-write head and moving in a predetermined arm path between a predetermined arm front position and a predetermined arm rear position;

biasing means connected to said arm for biasing said movable end towards said predetermined arm rear position; and a path guide located adjacent to said arm for guiding said arm in at least a part of the predetermined arm path and placing said arm such that said movable end is at the predetermined arm front position when said platform is positioned at said second predetermined position thereby allowing said read-write head to freely move over the disk.

7. The data storage device recited in claim 6 wherein said biasing means is a spring and said spring is positioned to form an acute angle with respect to said arm.

8. The data storage device recited in claim 6 wherein said path guide further comprises:
   a front post located near said predetermined arm front position for preventing said arm from moving beyond said front post; and
   a rear post located near said predetermined arm rear position for preventing said arm from exerting pressure on said read-write head at said predetermined park position.

9. The data storage device recited in claim 5 wherein said read-write head includes a rotary actuator.

10. The data storage device recited in claim 5 wherein said read-write head includes a linear actuator.

11. The data storage device recited in claim 5 further comprising a latch located near said predetermined head park position for latching said read-write head in said predetermined head park position.

12. A method of securing a retractable recording/writing head at a predetermined head park position along a path by a head retractor when a removable disk cartridge containing a disk is not in a disk drive housing or is ejected therefrom, comprising the steps of
   a) placing a bias upon the head retractor such that said recording/writing head is urged along said path towards the predetermined head park position;
   b) inserting the removable disk cartridge in the disk drive housing so as to generate a force to push the head retractor against an abutment and thereby overcome the bias placed in said step a) on the head retractor;
   c) ejecting the removable disk cartridge from the disk drive housing such that the head retractor is moved away from the abutment; and
   d) driving the retractable recording/writing head along said path to said predetermined park position due to the bias placed in said step a) by removing the force placed on said head retractor in said step b) upon ejecting the disk cartridge in said step c).

13. The method as recited in claim 12 wherein said head retractor moves in a predetermined circular path.

14. In a disk drive comprising a recording/writing head coupled to a slidable platform, a method of securing a retractable recording/writing head at a predetermined head park position by a head retractor when a removable disk cartridge containing a disk is not placed on a slidable platform, comprising the steps of:
   a) placing a bias upon the head retractor such that said recording/writing head is urged toward the predetermined head park position;
   b) inserting the removable disk cartridge on the slidable platform while sliding the slidable platform from a predetermined ejecting position to a predetermined receiving position so as to generate a force to overcome the bias placed in said step a) on the head retractor;
   c) ejecting the removable disk cartridge from the slidable platform while sliding the slidable platform from said predetermined receiving position to said predetermined ejecting position; and
   d) driving the retractable head to said predetermined park position due to the bias placed in said step a) by removing the force placed on said head retractor in said step b) upon ejecting the disk cartridge in said step c).

* * * * *